(12) United States Patent  
Fujimoto

(10) Patent No.: US 7,633,637 B2
(45) Date of Patent: Dec. 15, 2009

(54) COMPUTER, IMAGE PROCESSING SYSTEM, AND IMAGE PROCESSING METHOD

(75) Inventor: Hideki Fujimoto, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 843 days.

(21) Appl. No.: 11/223,007

(22) Filed: Sep. 12, 2005

(65) Prior Publication Data

US 2006/0203283 A1 Sep. 14, 2006

(30) Foreign Application Priority Data

Mar. 14, 2005 (JP) ............... 2005-071941

(51) Int. Cl.
*G06F 15/00* (2006.01)
*G06F 3/00* (2006.01)
(52) U.S. Cl. ..................... 358/1.14; 719/321
(58) Field of Classification Search ............... 358/1.14, 358/1.15, 1.16, 1.18, 435, 1.12, 400; 719/321, 719/327; 709/203, 208, 217, 221; 715/201, 715/209, 274, 961; 713/164, 170, 182; 370/254, 370/328, 349, 389; 399/23, 24; 710/19
See application file for complete search history.

(56) References Cited

U.S. PATENT DOCUMENTS 6,148,346 A * 11/2000 Hanson ................ 719/321

2003/0103226 A1 6/2003 Nishio
2004/0049578 A1 * 3/2004 Ohara ................... 709/224

FOREIGN PATENT DOCUMENTS

| JP | B2 2667401 | 6/1997 |
| JP | A 9-254376 | 9/1997 |
| JP | A 2001-294788 | 10/2001 |

* cited by examiner

*Primary Examiner*—Saeid Ebrahimi Dehkordy
(74) *Attorney, Agent, or Firm*—Oliff & Berridge, PLC

(57) ABSTRACT

A computer has a selecting section, an acquiring section, a display control section, a setting section and a processing contents data transmitting section. The selecting section selects an image processing device. The acquiring section acquires from the image processing device selected by the selecting section, display data for displaying a setup screen which sets contents of an image processing that the image processing device executes. The display control section, on the basis of the display data acquired by the acquiring section, effects control such that the setup screen is displayed on a display. The setting section sets the contents of the image processing via the setup screen displayed on the display. The processing contents data transmitting section transmits, to the image processing device, processing contents data expressing the contents of the image processing set by the setting section.

6 Claims, 8 Drawing Sheets

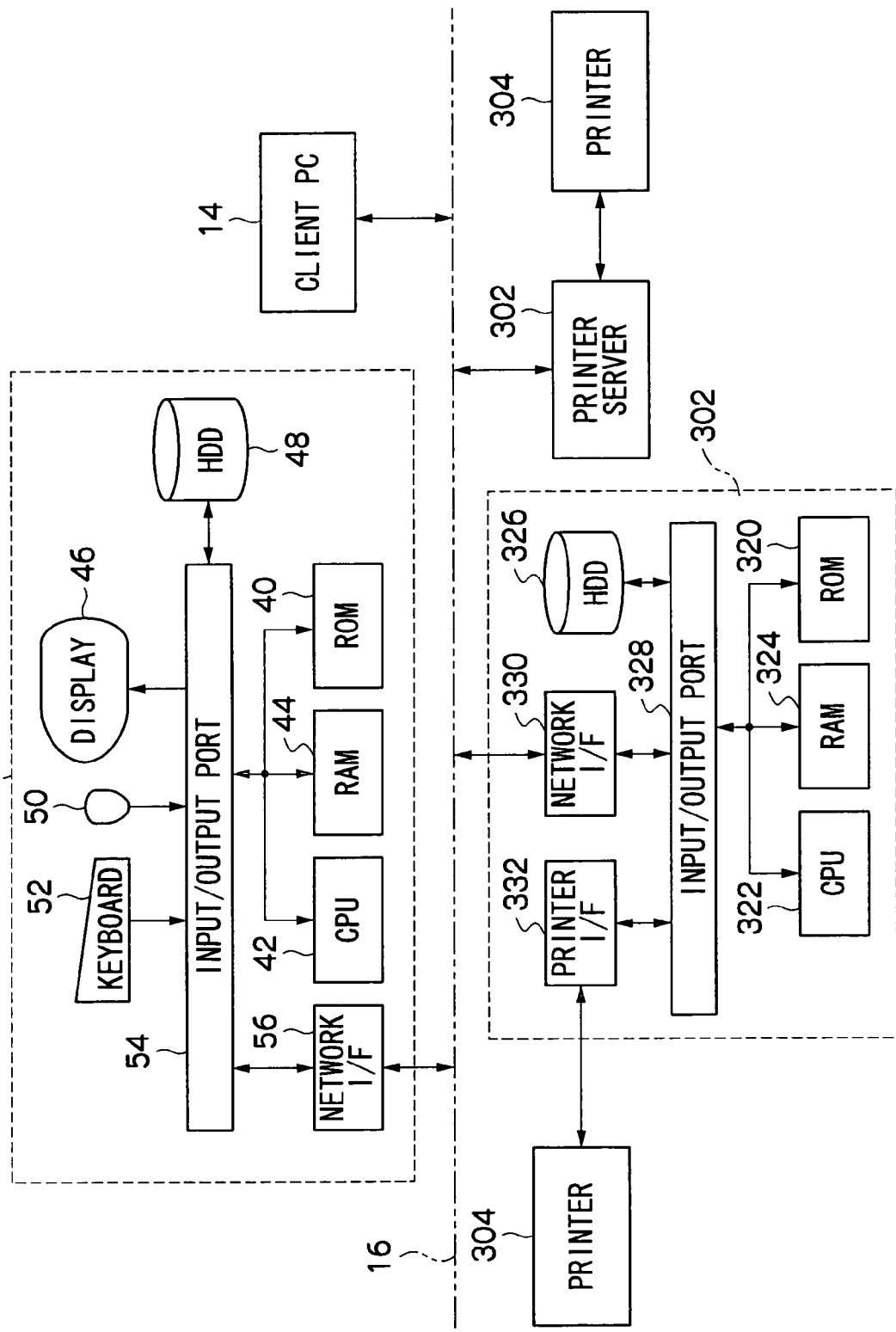

COMPUTER, IMAGE PROCESSING SYSTEM, AND IMAGE PROCESSING METHOD

CROSS-REFERENCE TO RELATED APPLICATION

This application claims priority under 35 USC 119 from Japanese Patent Application No. 2005-071941, the disclosure of which is incorporated by reference herein.

BACKGROUND OF THE INVENTION

1. Field of the Invention

The present invention relates to a computer, an image processing system, and an image processing method, and in particular, to a computer, an image processing system, and an image processing method in which a computer requests an image processing device to execute an image processing.

2. Description of the Related Art

Conventionally, when a user, from a computer, requests an image processing device such as a printer or the like to print, print setup is carried out by a printer driver which is installed in the computer. Data, which express items to be set and options which can be set in accordance with the device structure of the object printer, are included in the printer driver.

As devices which facilitate installation of a printer driver, there are known a printer driver providing system (Japanese Patent Application Laid-Open (JP-A) No. 2004-110678) which automatically generates a printer driver corresponding to the demands of the user and provides the printer driver to a client PC via a network, and a network printer (JP-A No. 2004-220452) which installs the appropriate driver in a host device when the IP address of the network printer is inputted at the host device and the host device and the network printer are connected.

However, in the printer driver providing system disclosed in JP-A No. 2004-110678, when the client PC is connected to a plurality of printers via a network, respective printer drivers of the plural printers which are connected must be installed in the client PC. Therefore, the problem arises that the burden on the manager who manages the client PC is large.

Further, also in the network printer disclosed in JP-A No. 2004-220452, respective printer drivers of the plural printers connected to the host computer must be installed in the host computer, and therefore, the problem arises that the burden on the manager of the host computer is large.

SUMMARY

The present invention has been made in view of the above circumstances and therefore provides a computer. The computer has a selecting section, an acquiring section, a display control section, a setting section and a processing contents data transmitting section. The selecting section selects an image processing device. The acquiring section acquires from the image processing device selected by the selecting section, display data for displaying a setup screen which sets contents of an image processing. The display control section, on the basis of the display data acquired by the acquiring section, effects control such that the setup screen is displayed on a display. The setting section sets the contents of the image processing via the setup screen displayed on the display. The processing contents data transmitting section transmits, to the image processing device, processing contents data expressing the contents of the image processing set by the setting section.

BRIEF DESCRIPTION OF THE DRAWINGS

FIG. 8 is a schematic diagram showing the structure of a printing system relating to a second embodiment of the present invention.

DETAILED DESCRIPTION OF THE INVENTION

Hereinafter, embodiments of the present invention will be described with reference to the drawings.

Figure 1:
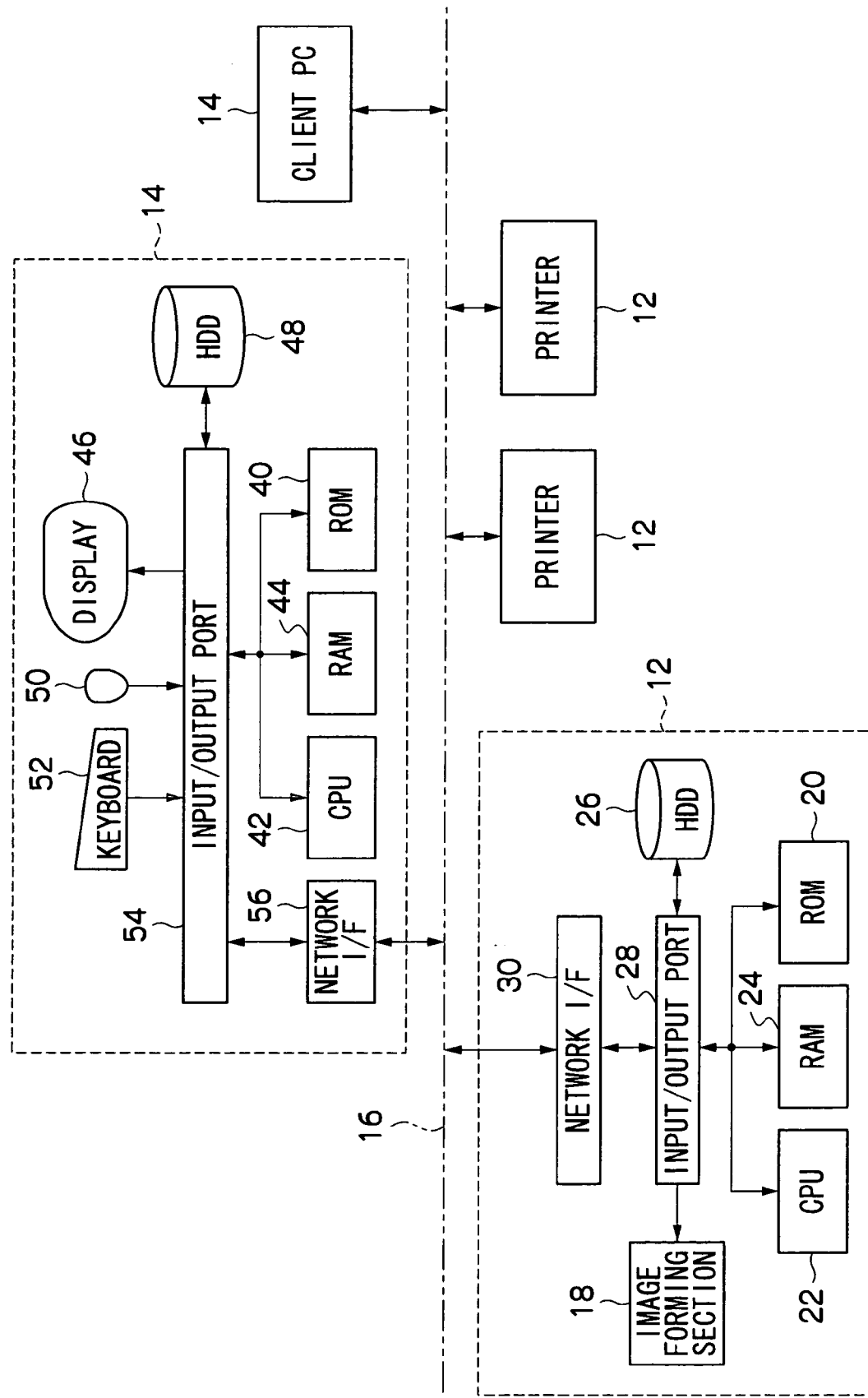
FIG. 1 is a schematic diagram showing the structure of a printing system relating to a first embodiment of the present invention.

As shown in FIG. 1, a printing system 10 relating to a first embodiment of the present invention is structured from: a plurality of printers 12; a plurality of client PCs 14 which carry out document creation and image processing, working, editing and the like of images; and a network 16 such as a LAN (Local Area Network) or the like. The plurality of printers 12 and client PCs 14 are connected via the network.

The printer 12 has: an image forming section 18 which forms an image on a recording sheet; a ROM 20 which stores various types of programs including a program controlling the image forming section 18 and a program realizing the functions of a Web service, as well as a program realizing a setup screen generating processing routine, a program realizing a contradiction inspecting processing routine, and a program realizing a function execution possibility determining processing routine, which will be described later; a CPU 22 executing the various programs stored in the ROM 20; a RAM 24 temporarily storing data as a work area; an HDD 26 storing items to be set which relate to the printing processing, information showing option functions of the printing processing, image data, and the like; an input/output port 28 for inputting and outputting data; and a network interface 30 carrying out communication with the client PCs 14 connected to the network 16. The printer 12 has general functions which are conventionally known, and detailed description relating to the printing functions will be omitted.

Further, the client PC 14 has: a ROM 40 which stores a control program which controls the client PC 14 overall; a CPU 42 executing various types of programs; a RAM 44 temporarily storing data as a work area; and a display 46 which displays a setup screen for setting the contents of the printing processing of the printer 12, and the like.

The client PC 14 also has: an HDD 48 which stores programs which realize a setup screen display processing routine, a contradiction inspection calling processing routine, and a function execution possibility determination calling processing routine which will be described later, as well as a program realizing a browser function for displaying HTML files, programs carrying out image processing and document creation, and the like, the HDD 48 also storing and reading-out predetermined data; a mouse 50 which is a pointing device; a keyboard 52 which inputs documents and symbols and the like; an input/output port 54 to which these are connected; and a network interface 56. The input/output port 54 is connected to the network interface 56 which carries out communication with the printers 12 which are connected to the network 16. A personal computer of a conventionally-known, general structure can be used as the client PC 14, and in the present embodiment, detailed description of the other structures thereof will be omitted.

Figure 2:
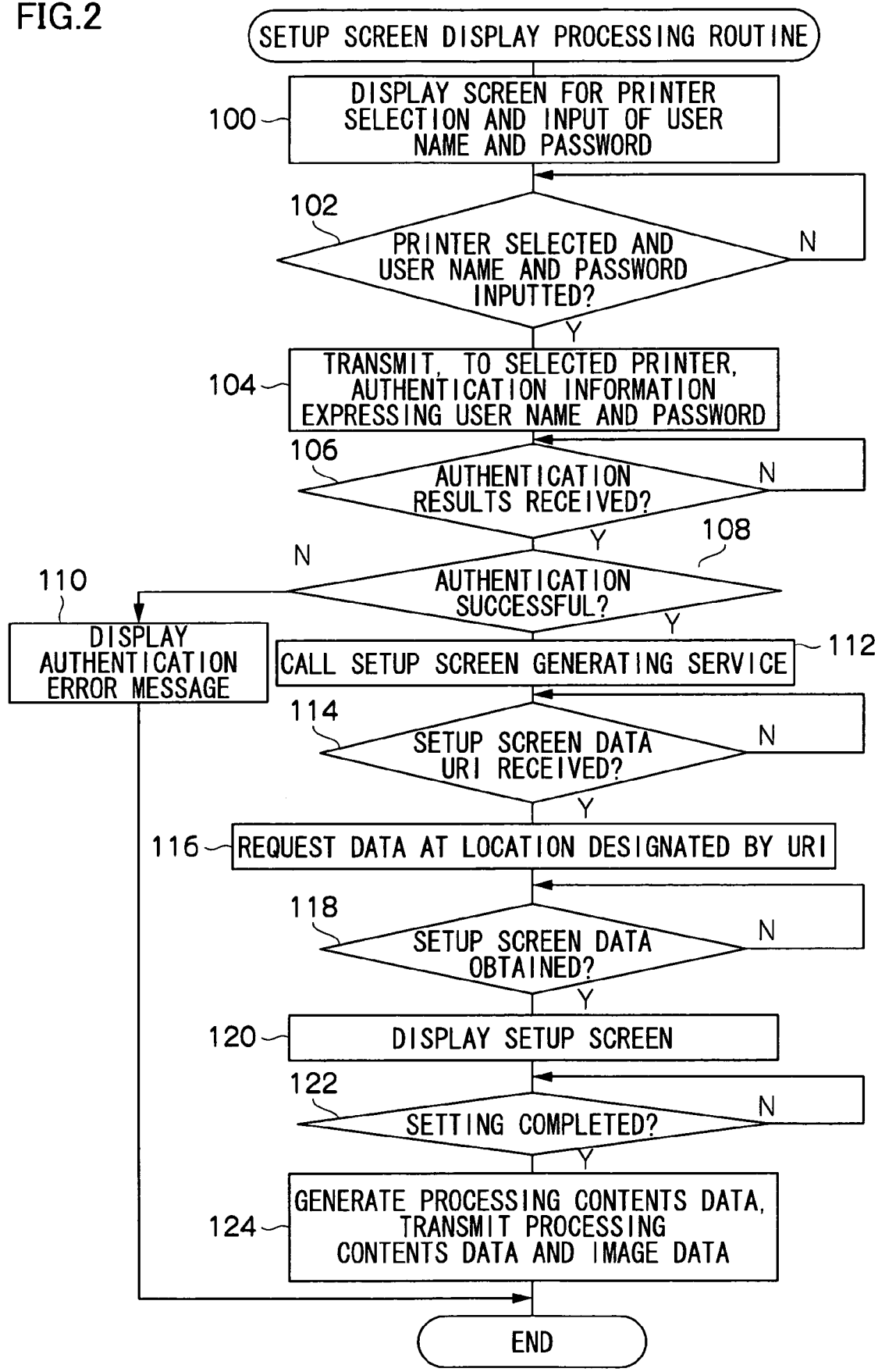
FIG. 2 is a flowchart showing the contents of a setup screen display processing routine of a client PC relating to the first embodiment of the present invention.

When the user creates data, such as an image or a document or the like, and stores it in the HDD 48 and instructs printing of the created data, the setup screen display processing routine shown in FIG. 2 is executed at the client PC 14.

First, in step 100, a screen for printer selection and input of a user name and password is displayed on the display 46. In step 102, a determination is made as to whether or not one of the plurality of printers 12 is selected and the user name and password are inputted. When, by operating the mouse 50 and the keyboard 52, the user selects one printer 12 from among the plural printers 12 and inputs the user name and password, the routine proceeds from step 102 to step 104 where authentication information, which expresses the user name and password, is transmitted to the printer 12 selected in step 102. Note that the transmission of the authentication information is carried out by SOAP (Simple Object Access Protocol) calling, and the authentication information is generated as a SOAP message, and this SOAP message is transmitted.

Figure 3:
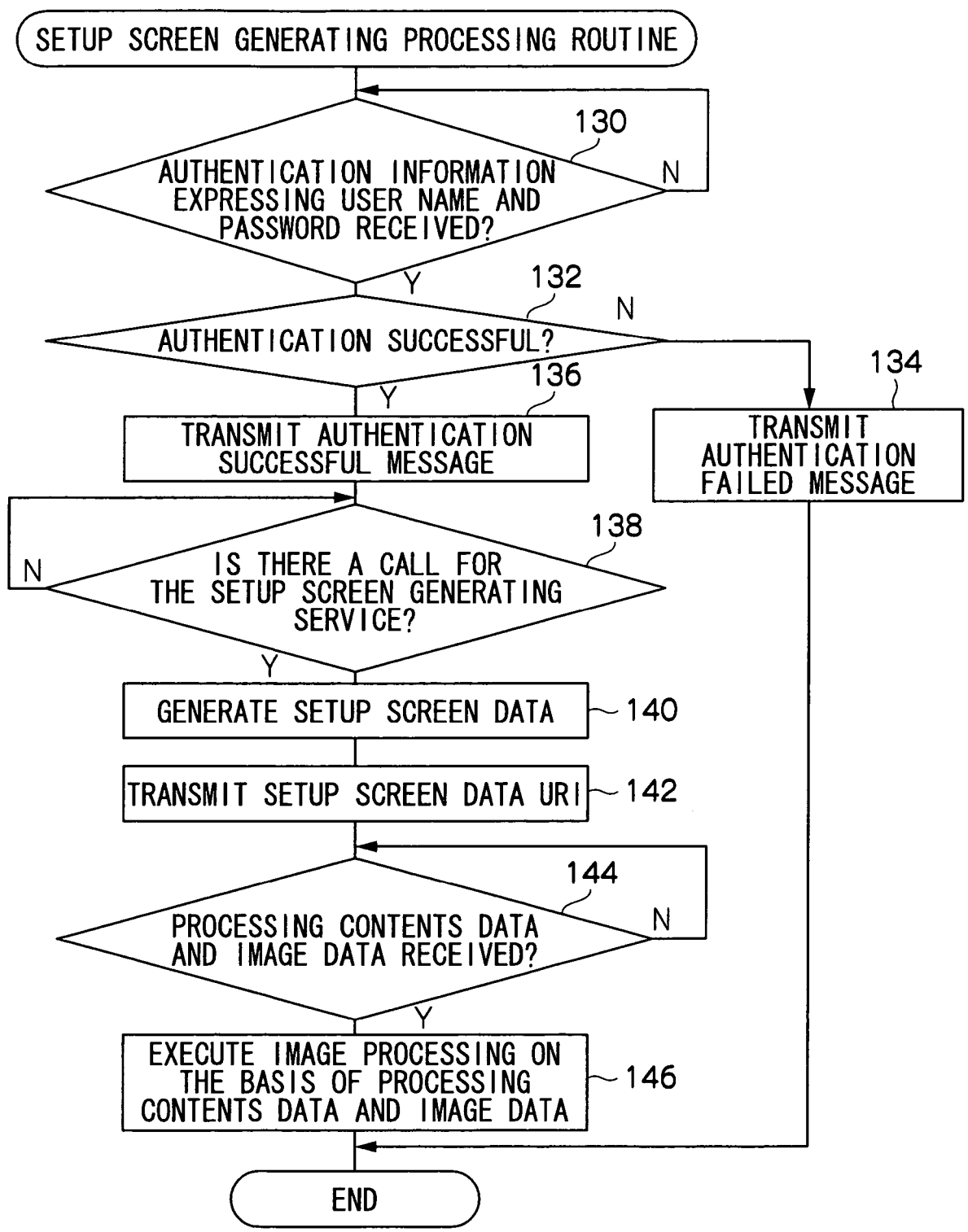
FIG. 3 is a flowchart showing the contents of a setup screen generating processing routine of a printer relating to the first embodiment of the present invention.

Next, a setup screen generating processing routine shown in FIG. 3 is executed at the selected printer 12. First, in step 130, it is determined whether or not the user name and password are received from the client PC 14. When the authentication information expressing the user name and password are received, the routine proceeds from step 130 to step 132. A user authentication file stored in advance in the HDD 26 is read, the respective user names and passwords registered in the user authentication file and the user name and the password expressed by the authentication information are compared, and it is authenticated whether or not the user is a legitimate user. If the user name and password do not match a user name and password registered in the user authentication file, the user is not a legitimate user. Therefore, in step 134, an authentication failed message is transmitted to the client PC 14, and the setup screen generating processing routine ends. However, if the user name and password match a user name and password registered in the user authentication file, it is authenticated that the user is a legitimate user, and in step 136, an authentication successful message is transmitted to the client PC 14. Note that the authentication failed message and the authentication successful message also are transmitted as SOAP messages.

Then, in the setup screen display processing routine shown in FIG. 2 of the client PC 14, in step 106, it is determined whether or not authentication results are received from the selected printer 12. When authentication results are received, the routine proceeds from step 106 to step 108 where it is determined whether or not the authentication was successful. If an authentication failed message is received from the selected printer 12, in step 110, an authentication error message is displayed on the display 46, and the setup screen display processing routine ends. On the other hand, if an authentication successful message is received, in step 112, a setup screen generating service, which generates a setup screen for setting the printing processing, is called by a SOAP call from the selected printer 12.

Next, at the selected printer 12, in the setup screen generating processing routine shown in FIG. 3, in step 138, it is determined whether or not there is a call for the setup screen generating service. If a SOAP message, which expresses a call for the setup screen generating service, is received from the client PC 14, the routine moves on from step 138 to step 140 where setup screen data for displaying a setup screen is generated, for example, as an HTML file, and the setup screen data is stored at an address which can realize a Web service function. In step 142, information, which expresses a URI (Uniform Resource Identifier) which is the address at which the generated setup screen data is stored, is transmitted by a SOAP message.

The setup screen data is data for displaying a screen which shows the printer properties. The setup screen data is generated, on the basis of information which is stored in the HDD 26 and which expresses the items to be set relating to the printing processing and the option functions of the printing processing, such that parameter setting columns for the items to be set and selection columns for the option functions are displayed in the setup screen. Further, the setup screen data is generated such that an inspect contradiction button and a determine function execution possibility button, which will be described later, are displayed in the setup screen. Moreover, the setup screen data is generated such that, at the time when the setup screen is displayed, initial values are set in advance in the parameter setting columns of the items to be set.

By generating initial value information for each user and storing it in the HDD 26, initial values can be set in advance in the parameter setting columns on the basis of the initial value information corresponding to the user.

Then, in the setup screen display processing routine shown in FIG. 2 of the client PC 14, in step 114, it is determined whether or not the information expressing the URI of the setup screen data is received. When a SOAP message, which is formed from information expressing the URI, is received from the selected printer 12, the routine proceeds from step 114 to step 116 where the data stored at the location designated by the URI is requested from the printer 12. In step 118, it is determined whether the setup screen data stored at the location designated by the URI is acquired from the printer 12. When the setup screen data is transferred from the printer 12, the routine moves on from step 118 to step 120 where a program having a browser function is executed, the setup screen data which is an HTML file is interpreted, and the setup screen is displayed on the display 46.

Figure 4:
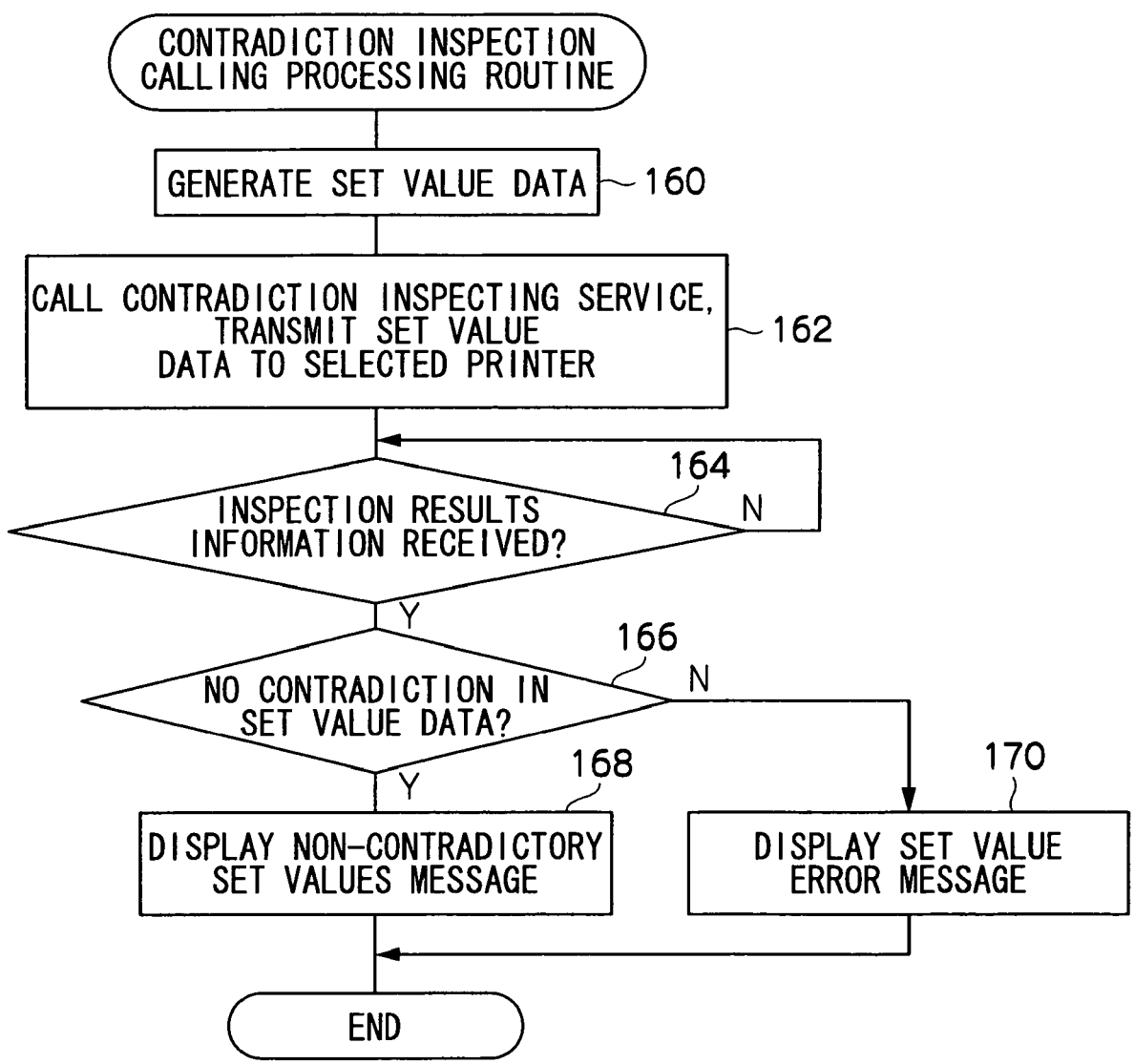
FIG. 4 is a flowchart showing the contents of a contradiction inspection calling processing routine of the client PC relating to the first embodiment of the present invention.

The user operates the mouse 50 and the keyboard 52 with respect to the setup screen displayed on the display 46, and changes the set values of the parameters. When the user clicks on the inspect contradiction button which is provided on the setup screen in order to inspect whether or not there are contradictions in the combination of the set values, a contradiction inspection calling processing routine shown in FIG. 4 is executed at the client PC 14. First, in step 160, set value data is generated on the basis of the set values which are inputted at the various items to be set of the setup screen. In step 162, a contradiction inspecting service of the selected printer 12 is called, and a SOAP message expressing the set data is transmitted to the selected printer 12. For example, the set values of the set value data are a usage flag of the stapler function and parameters of the print size, and the contradiction inspecting service inspects whether or not the combination of the set print size and the using of the stapler function is contradictory.

Figure 5:
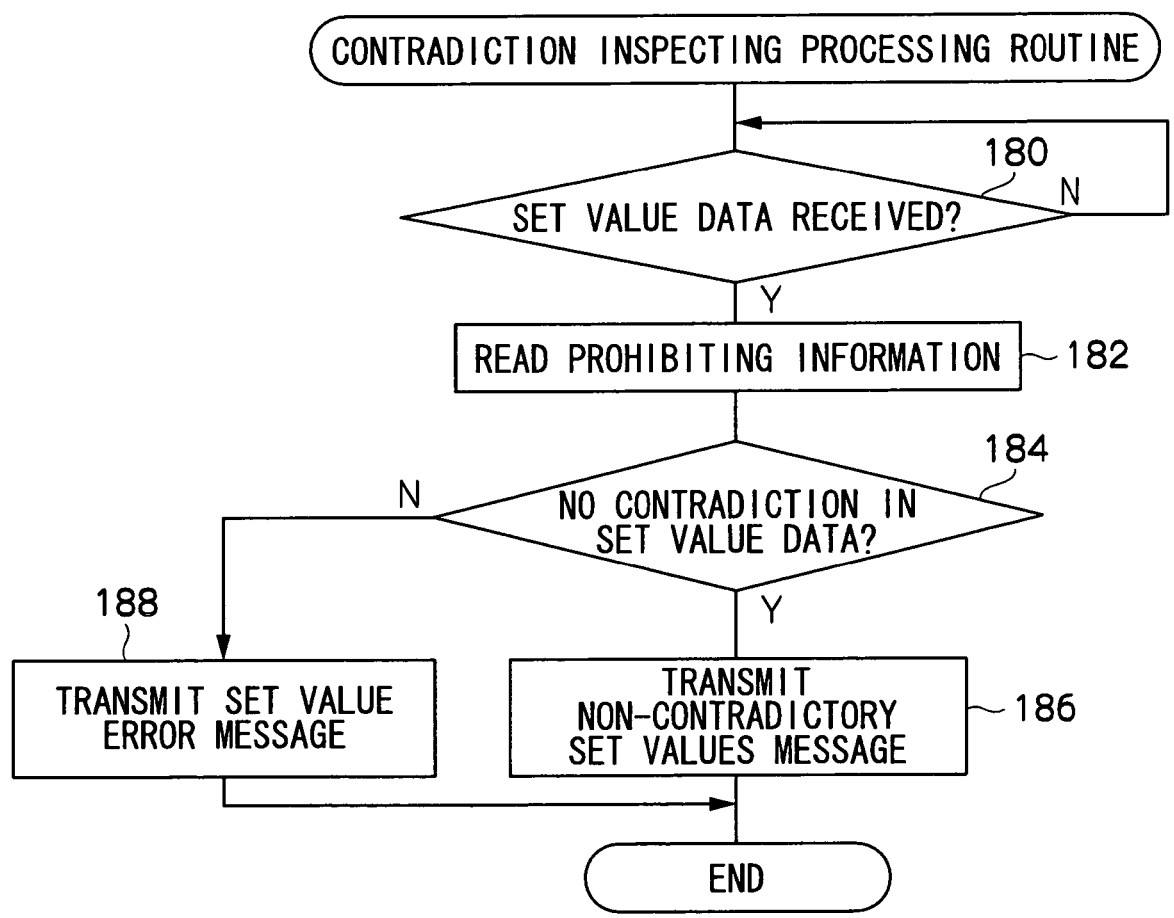
FIG. 5 is a flowchart showing the contents of a contradiction inspecting processing routine of the printer relating to the first embodiment of the present invention.

Next, when the SOAP message is received from the client PC 14 and the contradiction inspection service is called, at the printer 12, a contradiction inspecting processing routine shown in FIG. 5 is executed. First in step 180, it is determined whether or not the set value data is received. When the SOAP message expressing the set value data is received from the client PC 14, the routine proceeds from step 180 to step 182, and prohibiting information stored in the HDD 26 is read. The prohibiting information is information which is used in determining whether or not the combination of set values is contradictory with respect to the structure of the printer 12, e.g., combination conditions of set values in cases in which there are contradictions, or the like, are stored.

Then, in step 184, on the basis of the prohibiting information, it is determined whether or not the combination of set values shown by the set value data is contradictory. If it is determined that there is no contradiction in the combination of set values expressed by the set value data, in step 186, a SOAP message expressing a non-contradictory set values message is transmitted to the client PC 14, and the contradiction inspecting processing routine ends. On the other hand, in a case in which there is a contradiction in the combination of set values expressed by the set value data, in step 188, a SOAP message expressing a set value error message is transmitted to the client PC 14, and the contradiction inspecting processing routine ends. Note that the set value error message may include information that specifies which combination of set values is contradictory with respect to the structure of the printer 12.

Then, in the contradiction inspection calling processing routine shown in FIG. 4 of the client PC 14, in step 164, it is determined whether inspection results information is received. When a SOAP message expressing a non-contradictory set values message or a set value error message is received from the selected printer 12, the routine proceeds from step 164 to step 166 where it is determined whether or not there is a contradiction in the set data. In a case in which a non-contradictory set values message is received in step 164, in step 168, a non-contradictory set values message is displayed on the display 46, and the contradiction inspection calling processing routine ends. On the other hand, in a case in which a set value error message is received in step 164, in step 170, a set value error message is displayed on the display 46, and the contradiction inspection calling processing routine ends.

Figure 6:
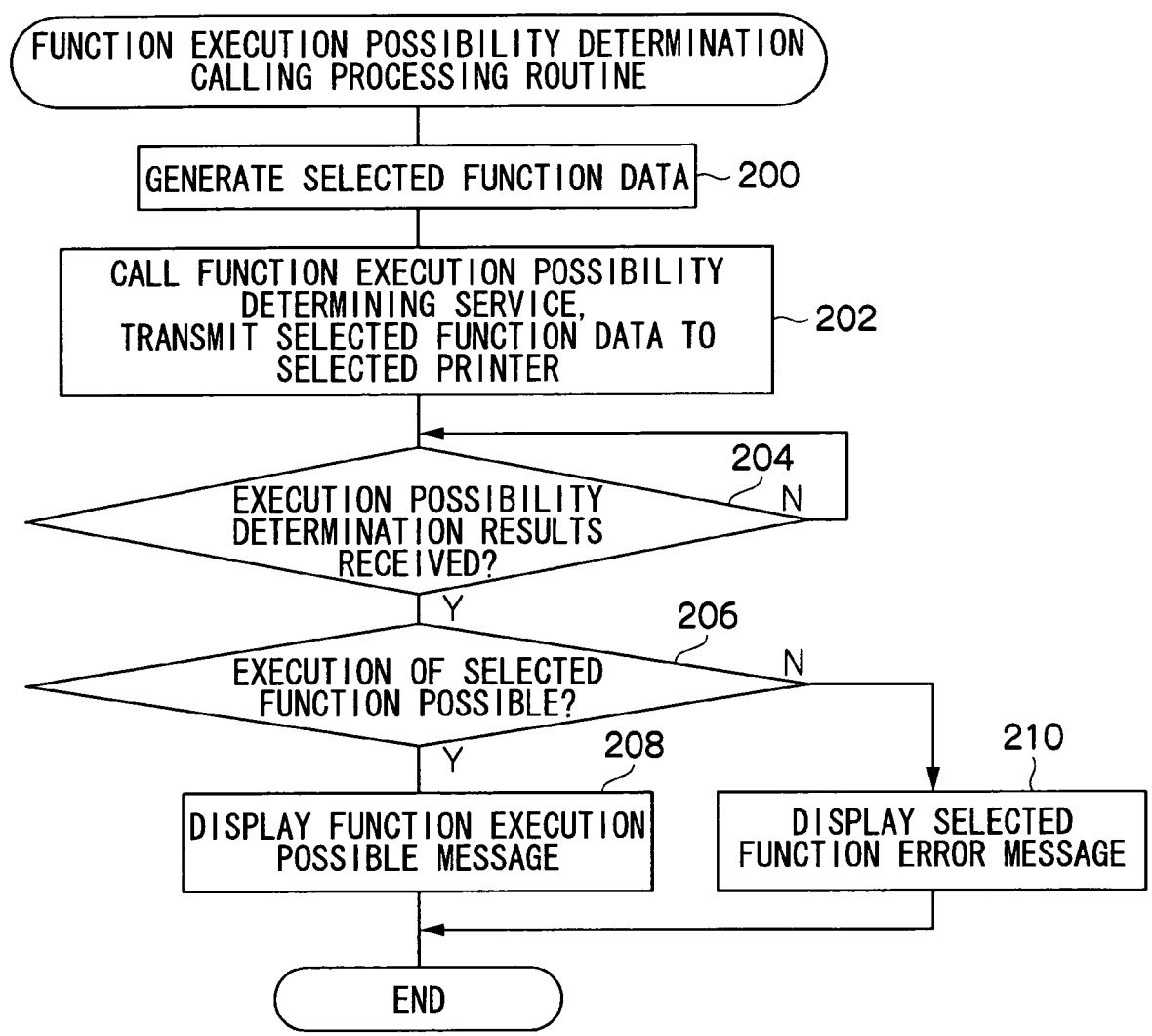
FIG. 6 is a flowchart showing the contents of a function execution possibility determination calling processing routine of the client PC relating to the first embodiment of the present invention.

Further, when the user operates the mouse 50 and the keyboard 52 with respect to the setup screen displayed on the display 46, and selects an option function, and clicks on the determine function execution possibility button which is provided on the setup screen for inquiring as to whether or not the selected option function can be executed, a function execution possibility determination calling processing routine shown in FIG. 6 is executed at the client PC 14. First, in step 200, selected function data showing the selected option function is generated. In step 202, a function execution possibility determining/responding service of the selected printer 12 is called, and a SOAP message expressing the selected function data is transmitted to the selected printer 12. Examples of the option function expressed by the selected function data are a delay service function which executes printing processing at the time when there are no tasks, and double-sided printing, and the like. At the function execution possibility determining/responding service, it is determined whether or not processing of such option functions can be executed by the printer 12.

Figure 7:
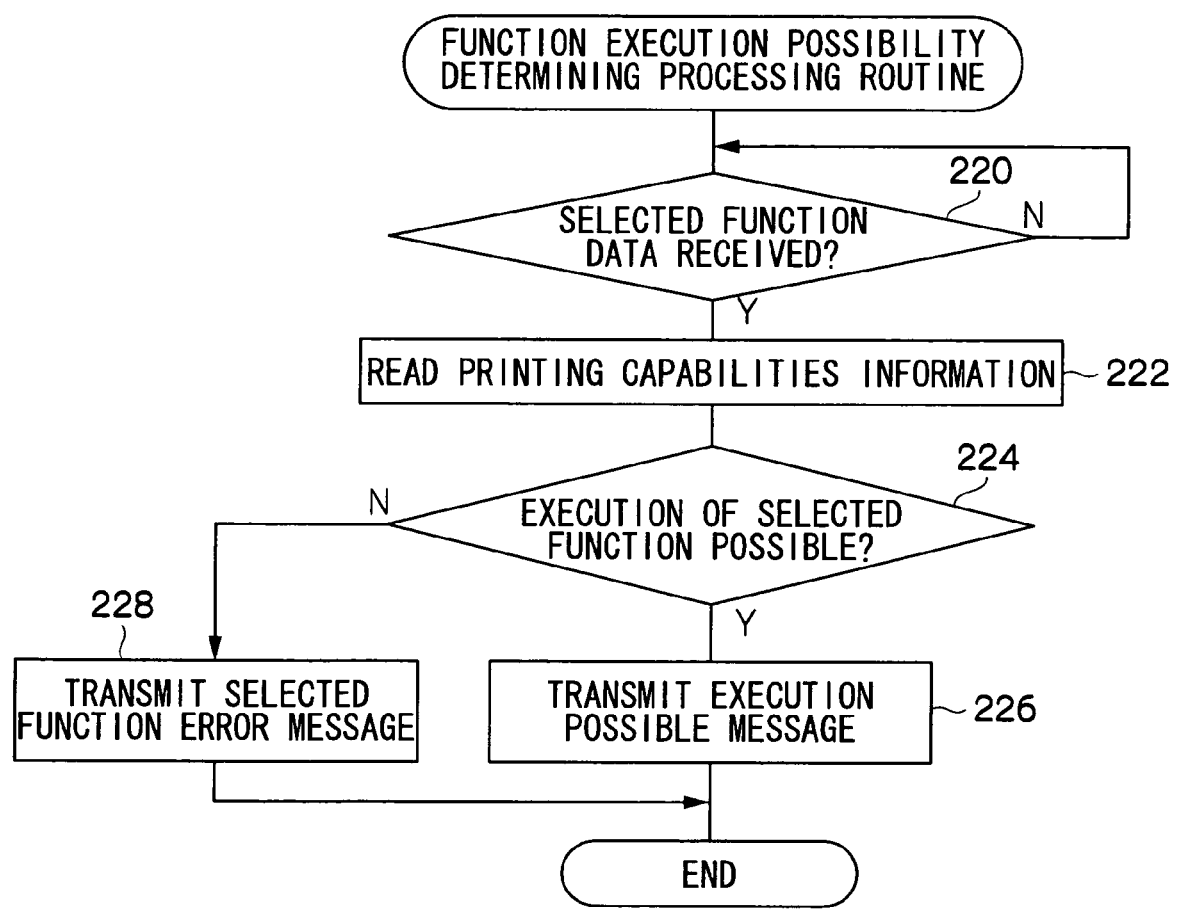
FIG. 7 is a flowchart showing the contents of a function execution possibility determining processing routine of the printer relating to the first embodiment of the present invention.

Next, when the function execution possibility determining/responding service is called, a function execution possibility determining processing routine shown in FIG. 7 is executed at the printer 12. First, in step 220, it is determined whether selected function data is received. When a SOAP message expressing selected function data is received from the client PC 14, the routine moves on from step 220 to step 222 where printing ability information stored in the HDD 26 is read. The printing ability information is information which is used in order to determine whether or not the option function can be executed at the printer 12. For example, a list of option functions which can be executed, or the like, is stored. Further, in cases in which it is desired to limit, in accordance with the users, the option functions which can be used, the printing ability information may be stored per user.

Then, in step 224, on the basis of the printing ability information, it is determined whether or not the option function expressed by the selected function data can be executed. If it is determined that the option function can be executed, in step 226, a SOAP message expressing an execution possible message is transmitted to the client PC 14, and the function execution possibility determining processing routine ends. On the other hand, in a case in which the option function expressed by the selected function data cannot be executed by the printer 12, in step 228, a SOAP message expressing a selected function error message is transmitted to the client PC 14, and the function execution possibility determining processing routine ends. Note that the selected function error message may include information specifying the option function which cannot be executed.

Then, in the function execution possibility determination calling processing routine shown in FIG. 6 of the client PC 14, in step 204, it is determined whether or not execution possibility determination results information is received. When a SOAP message expressing an execution possible message or a selected function error message is received from the selected printer 12, the routine moves on from step 204 to step 206, and it is determined whether or not the option function expressed by the selected function data can be executed. In a case in which an execution possible message is received in step 204, in step 208, a function execution possible message is displayed on the display 46, and the function execution possibility determination calling processing routine ends. On the other hand, in a case in which a selected function error message is received in step 204, in step 210, a selected function error message is displayed on the display 46, and the function execution possibility determination calling processing routine ends.

Then, at the client PC 14, in the setup screen display processing routine shown in FIG. 2, in step 122, it is determined whether or not setup of printing processing by the setup screen is completed. After the user confirms that there are no contradictions in the combination of changed set values and confirms that the selected option function can be executed, when the user clicks on an execute printing processing button provided on the setup screen displayed on the display 46, the routine moves on from step 122 to step 124. Processing contents data is generated on the basis of the set contents, a SOAP message formed from the processing contents data and the image data which is the object of printing is transmitted to the selected printer 12, and the setup screen display processing routine ends.

Then, at the printer 12, in the setup screen generating processing routine shown in FIG. 3, in step 144, it is determined whether or not the processing contents data and the image data are received. When the SOAP message formed from the processing contents data and the image data is received from the client PC 14, the routine proceeds from step 144 to step 146. On the basis of the processing contents data and the image data, printing processing is executed at the image forming section 18. An image is formed on a recording sheet, and the setup screen generating processing routine ends.

As described above, in accordance with the printing system relating to the first embodiment, a client PC acquires setup screen data transferred from a printer. On the basis of the setup screen data, the client PC displays a setup screen on a display. By setting the contents of the printing processing and transmitting the processing contents data to the printer, there is no need to install a printer driver corresponding to the printer in advance in the client PC. Therefore, even if a plurality of printers are connected to a client PC, the burden on the manager can be prevented from becoming large. Further, by carrying out at the printer the contradiction inspection as to whether or not there is a contradiction in the set processing contents data, and execution possibility determination as to whether or not an option function can be executed, there is no need for the client PC to store option function information and prohibiting information of the set processing contents. Therefore, even if a plurality of printers are connected to a client PC, the burden on the manager can be prevented from becoming large.

Even when the functions of the printer change such as the version is upgraded or the like, the need for an operation for updating the printer driver installed in the client PC does not arise, and therefore, the burden on the manager can be reduced.

Further, due to user authentication being carried out at the printer, a system can be structured in which only legitimate users can instruct execution of printing processing. Moreover, at the printer, restrictions on the option functions which can be used can be set in accordance with the users.

Note that explanation has been given of a case in which the printer generates the setup screen data in accordance with a call for the setup screen generating service from the client PC. However, setup screen data which is generated in advance may be stored in the HDD, and, in accordance with a call for the setup screen generating service from the client PC, information expressing the URI of the stored setup screen data may be transmitted to the client PC.

Next, a printing system 300 relating to a second embodiment will be described by using FIG. 8. Note that portions which are the same as those of the first embodiment are denoted by the same reference numerals, and description thereof is omitted. In the second embodiment, the point that printers 304 are connected to the network 16 via print servers 302 for controlling the printers 304 differs from the first embodiment.

The printer server 302 has a ROM 320 which stores various types of programs including a program realizing a Web service function, as well as the program realizing the setup screen generating processing routine, the program realizing the contradiction inspecting processing routine, and the program realizing the function execution possibility determining processing routine which were described in the first embodiment; a CPU 322 executing the various programs stored in the ROM 320; a RAM 324 temporarily storing data as a work area; an HDD 326 storing image data, as well as the user authentication file, the prohibiting information, the printing ability information, and the like which were described in the first embodiment; an input/output port 328 for inputting and outputting data; a network interface 330 carrying out communication with the client PCs 14 connected to the network 16; and a printer interface 332 carrying out communication with the printer 304.

A printer having general functions which are conventionally known is used as the printer 304, and description relating to the printing functions thereof will be omitted.

The setup screen generating processing routine, the contradiction inspecting processing routine, and the function execution possibility determining processing routine, which were described in the first embodiment, are executed at the printer server 302. Due to the printer server 302 outputting, to the printer 304, processing contents data and image data received from the client PC 14, the printer server 302 makes the printer 304 execute printing processing. Note that the setup screen generating processing routine, the contradiction inspecting processing routine, and the function execution possibility determining processing routine, which are executed at the printer server 302, are the same as in the first embodiment, and the operation of the client PC 14 as well is the same as in the first embodiment. Therefore, detailed description of the operation of the second embodiment will be omitted.

As described above, in accordance with the printing system relating to the second embodiment, a client PC acquires setup screen data transferred from a printer server. On the basis of the setup screen data, the client PC displays a setup screen on a display. By setting the contents of the printing processing and transmitting the processing contents data to the printer server, there is no need to install a printer driver corresponding to the printer in the client PC. Therefore, even if a plurality of printers are connected to a client PC via printer servers, the burden on the manager can be prevented from becoming large.

Note that the above embodiment describes, as an example, a case in which all of the printers are connected to the network via printer servers. However, printers which are directly connected to the network may be provided. For printers which are directly connected to the network, it suffices that they be structured the same as and that the same processing be carried out as at the printers relating to the first embodiment.

Accordingly, on the basis of image data acquired from an image processing device, a setup screen is displayed on a display, the contents of image processing are set, and the processing contents data are transmitted to the image processing device. In this way, there is no need to install, in the computer, data for setting the contents of the image processing of the image processing device. Therefore, even if a plurality of image processing devices are connected to a computer, an increase in the burden on the manager can be prevented.

Accordingly, a computer acquires display data transferred from an image processing device, and on the basis of the display data, displays a setup screen on a display, and sets the contents of image processing and transmits the processing contents data to the image processing device. In this way, there is no need to install, in the computer, data for setting the contents of the image processing of the image processing device. Therefore, even if a plurality of image processing devices are connected to a computer, an increase in the burden on the manager can be prevented.

As described above, in accordance with the computer, the image processing system, and the image processing method of the present invention, a computer acquires, from an image processing device, display data for displaying a setup screen for setting contents of image processing, and transmits processing contents data to the image processing device. In this way, there is no need to install, in the computer, data for setting the contents of the image processing of the image processing device. Therefore, there is the effect that, even if a plurality of image processing devices are connected to a computer, an increase in the burden on the manager is prevented.

As described above, according to an aspect of the present invention, a computer is connected to a plurality of image processing devices via a network. The computer is structured so as to include: a selecting section selecting one image processing device of the plurality of image processing devices; an acquiring section acquiring, from the image processing device selected by the selecting section, display data for displaying a setup screen which sets contents of an image processing that the image processing device executes; a display control section which, on the basis of the display data acquired by the acquiring section, effects control such that the setup screen is displayed on a display; a setting section which sets the contents of the image processing via the setup screen displayed on the display; and a processing contents data transmitting section transmitting, to the image processing device, processing contents data expressing the contents of the image processing set by the setting section.

According to an aspect of the present invention, one of the plurality of image processing devices is selected by the selecting section. Display data, which is for displaying a setup screen which sets contents of an image processing to be executed at the image processing device, is acquired by the acquiring section from the selected image processing device. Then, on the basis of the acquired display data, the display controlling section effects control such that the setup screen is displayed on the display. The contents of the image processing are set by the setting section via the displayed setup screen. The processing contents data, which expresses the set contents of the image processing, is transmitted to the image processing device by the processing contents data transmitting section.

According to an aspect of the present invention, an image processing system is provided. The system is structured so as to include a computer including: a selecting section selecting one image processing device of a plurality of image processing devices which are connected via a network, an acquiring section acquiring, from the image processing device selected by the selecting section, display data for displaying a setup screen which sets contents of an image processing that the image processing device executes, a display control section which, on the basis of the display data acquired by the acquiring section, effects control such that the setup screen is displayed on a display, a setting section which sets the contents of the image processing via the setup screen displayed on the display, and a processing contents data transmitting section transmitting, to the image processing device, processing contents data expressing the contents of the image processing set by the setting section; and a plurality of image processing devices including: a transferring section which transfers the display data to the computer, a processing contents data receiving section receiving the processing contents data from the computer, and an executing section executing the image processing on the basis of the processing contents data which is received.

According to an aspect of the present invention, an image processing method of an image processing system is provided. The method includes: selecting one image processing device of the plurality of image processing devices; transferring, to the computer, display data for displaying a setup screen which sets contents of an image processing to be executed; acquiring the display data from the selected image processing device; effecting control, on the basis of the acquired display data, such that the setup screen is displayed on a display; the computer setting the contents of the image processing via the setup screen displayed on the display; transmitting, to the selected image processing device, processing contents data expressing the set contents of the image processing; receiving the processing contents data from the computer; and executing the image processing on the basis of the received processing contents data.

According to an aspect of the present invention, the computer selects one of the plurality of image processing devices. The selected image processing device transfers, to the computer, display data for displaying a setup screen which sets contents of an image processing which is to be executed. The computer acquires the display data from the selected image processing device. On the basis of the acquired display data, the computer effects control such that the setup screen is displayed on a display, and sets the contents of the image processing via the displayed setup screen. Then, the computer transmits, to the selected image processing device, processing contents data which expresses the set contents of the image processing. The selected image processing device receives the processing contents data from the computer, and executes image processing on the basis of the received processing contents data.

What is claimed is:

1. A computer comprising:
  a selecting section which selects an image processing device;
  an acquiring section which acquires from the image processing device selected by the selecting section, display data for displaying a setup screen which sets contents of an image processing that the image processing device executes;
  a display control section which, on the basis of the display data acquired by the acquiring section, effects control such that the setup screen is displayed on a display;
  a setting section which sets the contents of the image processing via the setup screen displayed on the display; and
  a processing contents data transmitting section which transmits, to the image processing device, processing contents data expressing the contents of the image processing set by the setting section; and
  a confirmation section that confirms whether or not the image processing device executes the image processing based on the processing contents data.

2. An image processing system comprising:
  a computer including:
    a selecting section which selects an image processing device of a plurality of image processing devices which are connected via a network,
    an acquiring section which acquires, from the image processing device selected by the selecting section, display data for displaying a setup screen which sets contents of an image processing that the image processing device executes,
    a display control section which, on the basis of the display data acquired by the acquiring section, effects control such that the setup screen is displayed on a display,
    a setting section which sets the contents of the image processing via the setup screen displayed on the display,
    a processing contents data transmitting section which transmits, to the image processing device, processing contents data expressing the contents of the image processing set by the setting section, and a confirmation section that confirms whether or not the image processing device executes the image processing based on the processing contents data; and the plurality of image processing devices including:

a transferring section which transfers the display data to the computer, a processing contents data receiving section which receives the processing contents data from the computer, and an executing section executing the image processing on the basis of the processing contents data which is received.

3. An image processing system comprising:

a computer including:

a selecting section which selects an image processing device of a plurality of image processing devices which are connected via a network, an acquiring section which acquires, from the image processing device selected by the selecting section, display data for displaying a setup screen which sets contents of an image processing that the image processing device executes, a display control section which, on the basis of the display data acquired by the acquiring section, effects control such that the setup screen is displayed on a display, a setting section which sets the contents of the image processing via the setup screen displayed on the display, and a processing contents data transmitting section which transmits, to the image processing device, processing contents data expressing the contents of the image processing set by the setting section; and the plurality of image processing devices including:

a transferring section which transfers the display data to the computer, a processing contents data receiving section which receives the processing contents data from the computer, and an executing section executing the image processing on the basis of the processing contents data which is received, wherein the computer further includes:

an inspection results transmitting/receiving section which transmits, to the image processing device, a request for error inspection which inspects whether or not there is an error in the contents of the image processing expressed by the processing contents data, and which receives, from the image processing device, an inspection result of the error inspection; and the image processing device further includes:

an inspection request receiving section which receives, from the computer, the request for error inspection, an inspecting section inspecting whether or not there is an error in the contents of the image processing expressed by the processing contents data, when the inspection request receiving section receives the request for error inspection with respect to the processing contents data, and an inspection results transmitting/receiving section which transmits, to the computer, an inspection result by the inspecting section with respect to the processing contents data.

4. An image processing system comprising:

a computer including:

a selecting section which selects an image processing device of a plurality of image processing devices which are connected via a network, an acquiring section which acquires, from the image processing device selected by the selecting section, display data for displaying a setup screen which sets contents of an image processing that the image processing device executes, a display control section which, on the basis of the display data acquired by the acquiring section, effects control such that the setup screen is displayed on a display, a setting section which sets the contents of the image processing via the setup screen displayed on the display, and a processing contents data transmitting section which transmits, to the image processing device, processing contents data expressing the contents of the image processing set by the setting section; and the plurality of image processing devices including:

a transferring section which transfers the display data to the computer, a processing contents data receiving section which receives the processing contents data from the computer, and an executing section executing the image processing on the basis of the processing contents data which is received, wherein the computer further includes:

a determination results transmitting/receiving section which transmits, to the image processing device, a request for execution possibility determination which determines whether or not the contents of the image processing which the processing contents data expresses can be executed, and which receives, from the image processing device, determination results of the execution possibility determination; and the image processing device further includes:

a determination request receiving section which receives, from the computer, the request for execution possibility determination, a determining section which determines whether or not the contents of the image processing which the processing contents data expresses can be executed, when the determination request receiving section receives the request for execution possibility determination with respect to the processing contents data, and a determination results transmitting/receiving section which transmits, to the computer, determination results by the determining section with respect to the processing contents data.

5. An image processing system comprising:

a computer including:

a selecting section which selects an image processing device of a plurality of image processing devices which are connected via a network, an acquiring section which acquires, from the image processing device selected by the selecting section, display data for displaying a setup screen which sets contents of an image processing that the image processing device executes, a display control section which, on the basis of the display data acquired by the acquiring section, effects control such that the setup screen is displayed on a display, a setting section which sets the contents of the image processing via the setup screen displayed on the display, and a processing contents data transmitting section which transmits, to the image processing device, processing contents data expressing the contents of the image processing set by the setting section; and the plurality of image processing devices including:

a transferring section which transfers the display data to the computer, a processing contents data receiving section which receives the processing contents data from the computer, and an executing section executing the image processing on the basis of the processing contents data which is received, wherein the computer further includes:

an inputting section inputting a user name and a password, and an authentication transmitting/receiving section which transmits, to the image processing device, the user name and password inputted by the inputting section, and receiving authentication results; and the image processing device further includes:

an authentication data storing section that stores user names and passwords of legitimate users, in correspondence with each other, an authentication receiving section that receives the user name and password from the computer, a comparing section which, when the authentication receiving section receives the user name and password, compares the user name and password which are received and each of the user names and passwords stored in the authentication data storing section, an authenticating section which authenticates whether or not there is a legitimate user, on the basis of comparison results by the comparing section, and an authentication results transmitting section which transmits, to the computer, authentication results by the authenticating section.

6. An image processing method comprising:

selecting an image processing device of a plurality of image processing devices;

transferring, to a computer, display data for displaying a setup screen which sets contents of an image processing to be executed;

acquiring the display data from the selected image processing device;

effecting control, on the basis of the acquired display data, such that the setup screen is displayed on a display;

setting the contents of the image processing via the setup screen displayed on the display;

transmitting, to the selected image processing device, processing contents data expressing the set contents of the image processing;

receiving the processing contents data from the computer;

confirming whether or not the selected image processing device can executes the image processing based on the processing contents data; and executing the image processing on the basis of the received processing contents data when it is confirmed that the selected image processing device can execute the image processing based on the processing contents data.

* * * * *